United States Patent
Kumashiro

(10) Patent No.: US 12,092,014 B2
(45) Date of Patent: Sep. 17, 2024

(54) THERMOSTAT DEVICE AND METHOD FOR MANUFACTURING SAME

(71) Applicant: NIPPON THERMOSTAT CO., LTD., Kiyose (JP)

(72) Inventor: Tsuyoshi Kumashiro, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/030,362

(22) PCT Filed: Sep. 22, 2021

(86) PCT No.: PCT/JP2021/034672
§ 371 (c)(1),
(2) Date: Apr. 5, 2023

(87) PCT Pub. No.: WO2022/102250
PCT Pub. Date: May 19, 2022

(65) Prior Publication Data
US 2024/0018893 A1 Jan. 18, 2024

(30) Foreign Application Priority Data
Nov. 13, 2020 (JP) ................. 2020-189575

(51) Int. Cl.
*F01P 7/16* (2006.01)
*G05D 23/13* (2006.01)

(52) U.S. Cl.
CPC .............. *F01P 7/16* (2013.01); *G05D 23/134* (2013.01)

(58) Field of Classification Search
CPC ........ F01P 7/16; G05D 23/134; F16K 11/044; F16K 27/0263; F16K 31/002
See application file for complete search history.

(56) References Cited

U.S. PATENT DOCUMENTS

| 4,175,696 A | 11/1979 | Braukmann |
| 5,975,116 A | 11/1999 | Rosas et al. |
| 2011/0214626 A1* | 9/2011 | Watanabe ............... F01P 7/167 123/41.1 |

FOREIGN PATENT DOCUMENTS

| EP | 1806488 A1 | 7/2007 | |
| EP | 2372124 A2 * | 10/2011 | ............... F01P 7/16 |

(Continued)

OTHER PUBLICATIONS

Machine Translation of EP2372124A2 PDF File Name: "EP2372124A2_Machine_Translation.pdf".*

(Continued)

*Primary Examiner* — Grant Moubry
*Assistant Examiner* — Ruben Picon-Feliciano
(74) *Attorney, Agent, or Firm* — HAUPTMAN HAM, LLP

(57) ABSTRACT

This thermostat device is provided with a housing, a thermo element that moves in an axial direction in accordance with the temperature of a coolant, a valve body that is caused by the movement of the thermo element to move toward and away from a valve seat provided to the inner side of the housing and open and close a communication section between a first flow-through port and a second flow-through port, and a biasing member that biases the valve body toward the valve seat. The housing is provided with a main body section, a first housing member having the first flow-through port and the second flow-through port, and a second housing member that has the third flow-through port and that is fastened to the first housing member by rotating in a circumferential direction in relation to the first housing member.

10 Claims, 4 Drawing Sheets

(56) References Cited

FOREIGN PATENT DOCUMENTS

| | | |
|---|---|---|
| JP | S5267029 A | 6/1977 |
| JP | H07-301362 A | 11/1995 |
| JP | 2000-120901 A | 4/2000 |
| JP | 2006-342767 A | 12/2006 |
| JP | 2011-179480 A | 9/2011 |
| JP | 2019-178663 A | 10/2019 |
| JP | 2019-204186 A | 11/2019 |

OTHER PUBLICATIONS

PCT/ISA/210, "International Search Report for PCT International Application No. PCT/JP2021/034672," Dec. 21, 2021.

* cited by examiner

THERMOSTAT DEVICE AND METHOD FOR MANUFACTURING SAME

RELATED APPLICATIONS

The present application is National Phase of International Application No. PCT/JP2021/034672 filed Sep. 22, 2021, and claims priority from Japanese Application No. 2020-189575, filed Nov. 13, 2020, the disclosure of which is hereby incorporated by reference herein in its entirety.

TECHNICAL FIELD

The present invention relates to a thermostat device that allows easy assembling of members constituting a housing each other and reducing the cost required for manufacturing and a method for manufacturing the thermostat device.

BACKGROUND ART

The thermostat device is disposed at the inlet or outlet side of the coolant passage of an automobile engine, for example, and is utilized for controlling the temperature of the coolant circulating through the engine by circulating the coolant passing through or bypassing the radiator, through the engine, depending on the temperature of the coolant cooling the engine.

Regarding the structure of the housing to be an outer case of the thermostat device, as disclosed in PTL 1 (cf. FIG. 5), a first housing member 51 including a radiator-side pipe 51a leading to the radiator and a second housing member 52a including a bypass-side pipe 52a leading to a bypass passage which bypasses the radiator are formed separately and weld-bonded by a laser beam. In another case, as disclosed in PTL 2, members are joined by bolts and nuts.

As described above, the reason why a plurality of the separately formed members is integrated as housing by joining is that it is necessary to seal the inside by joining the housing members after a thermoelement (a temperature sensing unit), a valve body, a coil spring biasing the valve body, and others are disposed inside the housing.

CITATION LIST

Patent Literature

PTL 1: JP2006-342767
PTL-2: JPH07-301362

SUMMARY OF INVENTION

Technical Problem

Unfortunately, joining a plurality of housing members by welding requires equipment for vibration welding such as vibration welding apparatus and causes to rise in the manufacturing cost.

Further, since joining a plurality of housing members by bolt fastening requires a process of press-fitting a sleeve (a metal tube) into a bolt insertion hole, this causes to increase in the number of parts and processes and rise the manufacturing cost.

The present invention aims at providing a thermostat device that allows easy assembling of housing members constituting housing each other, reducing the manufacturing cost and a method for manufacturing the same with focusing on the above points.

Solution to Problem

The thermostat device according to the present invention is a thermostat device to be disposed at a connecting portion between a coolant passage that circulates the coolant passing through a radiator to the engine and a bypass passage that is connected to the coolant passage and circulates the coolant bypassing the radiator to the engine, and the thermostat device includes a main body section cylindrical-shaped having an accommodating chamber formed therein, a first flow-through port that communicates the radiator side of the coolant passage with the accommodating chamber, a second flow-through port that communicates the engine side of the coolant passage with the accommodating chamber, a housing having a third flow-through port that communicates the bypass passage with the accommodation chamber, a thermoelement accommodated in the accommodating chamber which is axially movable within the main body section according to the temperature of the coolant, a valve body that opens and closes a communication section between the first flow-through port and the second flow-through port by coming near to or away from a valve seat provided inside of the housing caused by the movement of the thermoelement, and a biasing member that biases the valve body toward the valve seat, wherein the housing includes the main body section, the first housing member having the first flow-through port and the second flow-through port, and the second housing member having the third flow-through port, which second housing member is fastened to the first housing member by rotating circumferentially relative to the first housing member.

A fastening portion of the first and second housing members preferably has a bayonet structure that a plurality of claws formed on one of the first and second housing members engage a plurality of locking portion formed on the other housing member corresponding to the plurality of claws.

Further, the second housing member desirably includes a bypass-side pipe with the third flow-through port formed inside, and the bypass-side pipe is preferably arranged such that the center of the bypass side pipe is located on the axis of rotation when the first housing member and the second housing member are fastened by circumferential relative rotation.

Further, the second housing member is provided with the bypass-side pipe with the third flow-through port formed inside, a cylindrical-shaped element retainer to which the thermoelement is inserted axially movably, and a spring seat to support the biasing member; the bypass-side pipe, the element retainer, and the spring seat are integrally formed desirably.

Further, the element retainer has a cylindrical portion protruding into the accommodation chamber. The cylindrical portion has a groove along the axial direction on the inner circumference of the cylindrical portion and a lateral hole opening into the groove. The groove forms a first flow passage that communicates the bypass passage with the accommodation chamber, and the lateral hole forms a second flow passage that communicates the bypass passage with the accommodation chamber.

Further, a member is desirably placed closer to the valve seat than the lateral hole in the movement direction of the thermoelement.

With this structure, the second housing member with the bypass side flow-through port is easily fastened to the first housing member with the radiator side flow-through port by rotation relative to the first housing member in the circumferential direction. This construction allows for reducing manufacturing costs and man-hours largely compared to fastening with bolts and nuts or by welding.

The method for manufacturing a thermostat device according to the present invention is a method for manufacturing the thermostat device described above which is characterized that the method has a first step of accommodating a unit to be accommodated in either the first housing member with a first flow-through port through which the coolant flows or the second housing member with a second flow-through port through which the coolant flows and a second step of the first housing member and the second housing member are fastened by relative rotation in the circumferential direction.

This method allows for fastening the second housing member with the bypass side flow-through port to the first housing member with the radiator side flow-through port by rotation relative to each other in the circumferential direction (desirably a bayonet method) easily. Accordingly, the manufacturing costs and man-hours are largely reduced compared to fastening with bolts and nuts or by welding.

Advantageous Effects of Invention

This invention provides a thermostat device whose housing members constituting the housing are easily assembled and which is capable of reducing the manufacturing costs, and a manufacturing method therefor.

DESCRIPTION OF EMBODIMENTS

Figure 1:
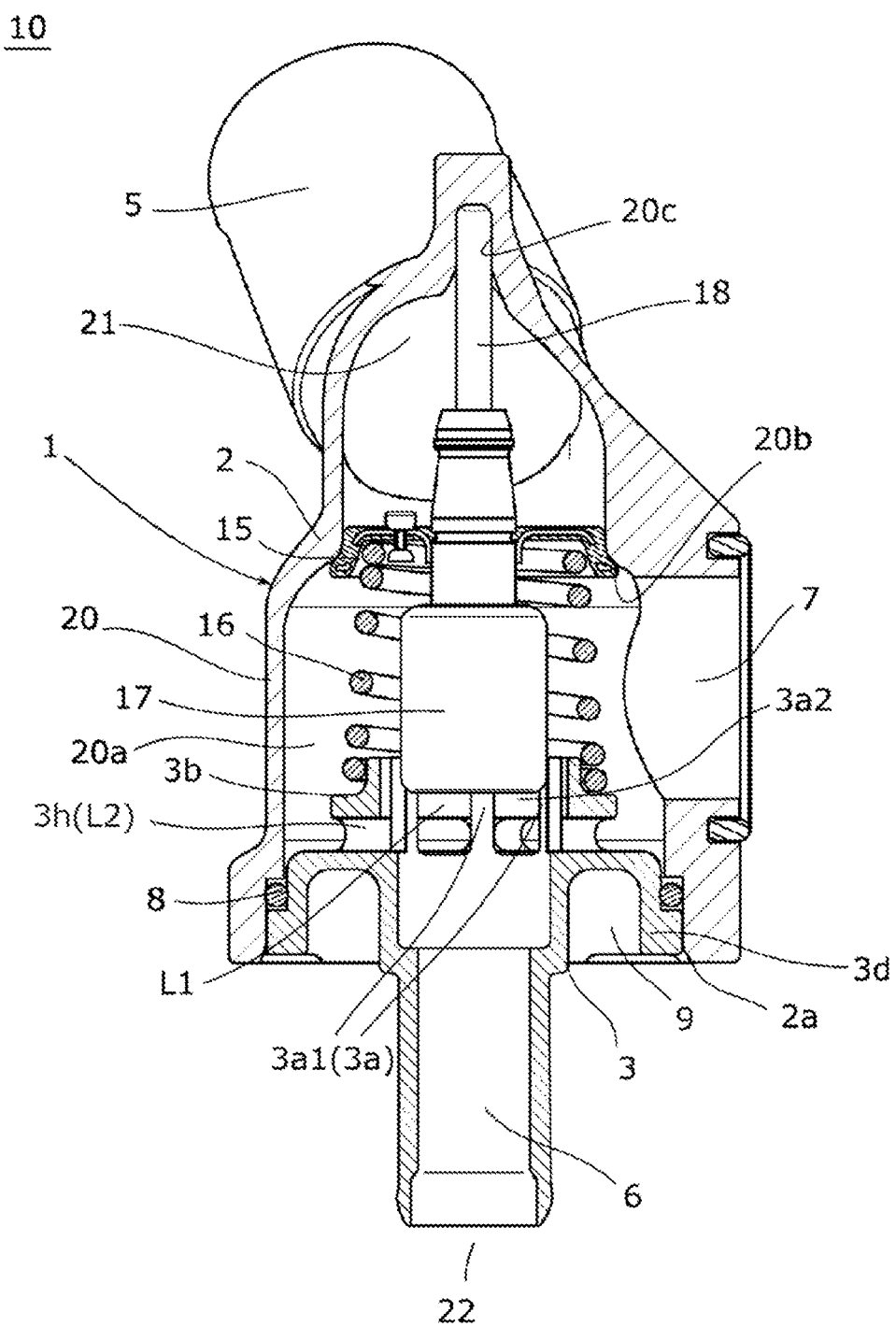
FIG. 1 is a cross-sectional view of a thermostat device according to the present invention.

An embodiment of a thermostat device according to the present invention will be described based on the drawings below. FIG. 1 is a cross-sectional view of the thermostat device according to the present invention.

The thermostat device 10 shown in FIG. 1 is equipped with a coolant system of an engine, for example. Specifically, the thermostat device 10 is disposed at a connecting portion of a cooling passage through which circulates the coolant passing through the radiator and a bypass passage connected to the cooling passage which circulates the coolant bypassing the radiator to the engine. The temperature of the coolant circulating through the engine is controlled by adjusting the flow rate of the coolant flowing through the cooling passage and the bypass passage.

The thermostat device 10 is provided with
a housing 1 for a thermostat (hereinafter simply referred to as housing 1) having a cylindrical-shaped main body section 20 inside which an accommodation chamber 20a is formed,
a thermoelement (temperature sensing unit) 17 accommodated in the main body section 20 movable in an axial direction, and
a piston 18 to be inserted in the thermoelement 17 retractably. In the followings, for convenience of explanation, the upper and lower portions of thermostat device 10 will simply be referred to as "the upper" and "the lower".

A main valve body 15 is equipped on the upper stage in the axial direction of the thermoelement 17 and can be seated on or unseated from the annular valve seat 20b which is formed on the inner wall of the housing 1. The thermostat device 10 is provided with a coil spring 16 as a biasing member which urges the main valve body 15 toward the valve seat 20b. The coil spring 16 is disposed to surround the thermoelement 17. A thermal expansion member such as wax is sealed in the thermoelement 17 and the tip end of the piston 8 is disposed facing the thermal expansion member.

When the coolant around the thermoelement 17 reaches a high temperature, which causes the thermal expansion member to expand by warming, the piston 18 retreats from the thermoelement 17. The top end of the piston 18 is fitted to a retaining section 20c having a cylindrical shape formed in the housing 1, and the motion of the piston upwards against the housing 1 is restricted.

This restriction causes the thermoelement 17 moves downward against the biasing force of the coil spring 16 and the piston 18 retreats from the thermoelement 17. At this time, the main valve body 15 moves downward with the thermoelement 17 to unseat from the valve seat 20b.

Meanwhile, when the coolant around the thermoelement 17 goes to a low temperature and the thermal expansion member contracts by cooling, the thermoelement 17 moves upward following the biasing force due to the coil spring 16 and the piston 18 enters the thermoelement 17. At this time, the main valve body 15 moves upward with the thermoelement 17 to come close to the valve seat 20b.

The members accommodated inside the housing 1 in the thermostat device 10, such as the piston 18, the thermoelement 17, the main valve body, and the coil spring 16 are collectively referred to as accommodated members. The housing 1 includes the cylindrical-shaped main body 20 accommodating the contained unit and opening downward, a main housing 2 (the first housing member) having the radiator-side pipe 5, and an auxiliary-housing 3 (the second housing member) having the bypass-side pipe 6, which auxiliary housing 3 is disposed at the lower side of the thermoelement 17 to cover a lower opening 2a of the main body section 20.

The inner side of the radiator-side pipe 5 is a flow-through port 21 to be an inlet of the coolant to the accommodating chamber 20a. In addition to the first flow-through port 21, a second flow-through port 7 to be an outlet of the coolant from the accommodating chamber 20a is formed in the main housing 2, opening to oppose the side portion of the thermoelement 17. The first flow-through port 21 and the second flow-through port 7 lead to cooling passages each communicating with the engine and the radiator. The coolant passing through the radiator goes to the engine through the first flow-through port 21, the accommodating chamber 20a, and the second flow-through port 7. Thus, the first flow-through port 21 communicates the radiator side of the cooling passage and the accommodating chamber 20a with each other, and the second flow-through port 7 communicates the engine-side of the cooling passage and the accommodating chamber 20a with each other.

As described above, when the thermoelement 17 is warmed and the main valve body 15 leaves the valve seat 20b, the flow rate of the coolant from the first flow-through port 21 to the second flow-through port 7 increases. On the contrary, when the thermoelement 17 is cooled and the main valve body 15 comes closer to the valve seat 20b, the flow rate of the coolant from the first flow-through port 21 to the second flow-through port 7 decreases. Thus the main valve body 15 opens and closes the communicating portion between the first flow-through port 21 and the second flow-through port 7 by approaching or leaving the valve seat 20b.

Figure 2A:
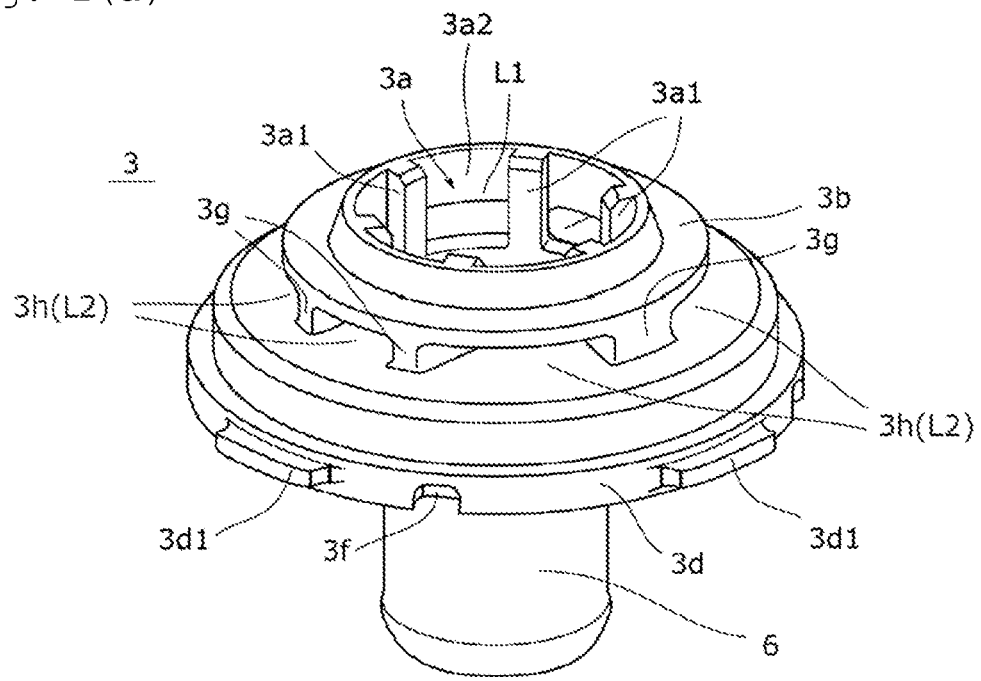
FIG. 2(a) is a perspective view of an auxiliary housing.
Figure 2B:
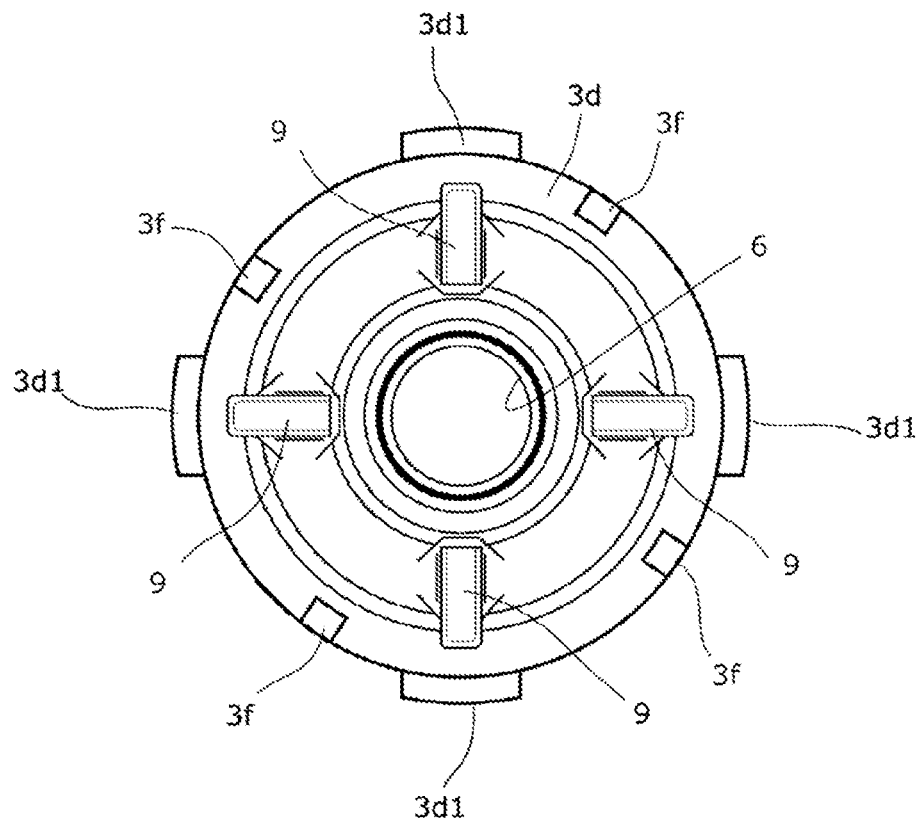
FIG. 2(b) is a bottom view of the auxiliary housing.

FIG. 2(a) is a perspective view of auxiliary housing 3, and FIG. 2(b) is a bottom view of auxiliary housing 3. As described above, the auxiliary housing 3 has a bypass-side pipe 6. The inside of bypass-side pipe 6 is a third flow-through port 22 to be an inlet of the coolant to the accommodating chamber 20a. The auxiliary housing 3 is provided with, other than the bypass-side pipe 6, an element retainer 3a which holds the thermoelement 17 in a slidably contacting manner, an annular-shaped lid 3d which covers a gap between the outer periphery of the element retainer 3a and the lower end of the main body section 20, and a spring seat 3b, formed at the circumference of the element retainer 3a located above the lid 3d, which supports the lower edge of the coil spring 16.

The lid 3d is the outer periphery of the element retainer 3a and is formed to protrude from the central part of the axial direction to the outer periphery side. The element retainer 3a is cylindrical and its inside communicates with the inside of the bypass-side pipe 6 (third flow-through port 22). When the upper portion of the element retainer 3a than the lid 3d is denoted a cylindrical portion 3a2, the cylindrical portion 3a2 protrudes into the accommodation chamber 20a. A plurality of grooves is formed along the axial direction on the inner circumference of the cylindrical portion 3a2, and a rib 3a1 is formed between the adjacent grooves. The ribs 3a1 are arranged with equal spacing in the circumferential direction of the cylindrical portion 3a2.

The thermoelement 17 is slidably inserted inside the circumferentially aligned ribs 3a1. The end face of the ribs 3a1 facing the thermoelement 17 is flush with the inner circumferential surface of the portion of the element retainer 3a below the lid 3d (the portion without grooves). The entering of the thermoelement 17 to the portion without ribs below the lid 3 causes the third flow-through port 22 to close to shut the communication passage between the accommodating chamber 20a and the bypass passage. Thus, in the present embodiment, the thermoelement 17 functions as an auxiliary valve that opens and closes the bypass passage.

When the low end of the thermoelement 17 positions halfway of the cylindrical portion 3a2 (the portion with grooves), the coolant in the bypass passage flows into the accommodation chamber 20a passing through the gap between the cylindrical portion 3a2 and the thermoelement 17 formed by the grooves. Thus the gap (groove) formed between the adjacent ribs 3a1 on the inner circumference of cylindrical portion 3a2 forms a first flow passage L1 which connects the bypass channel to accommodation chamber 20a. Since the coolant comes into contact with the outer circumferential surface of the thermoelement 17 when flowing into the accommodation chamber 20a through the first flow passage L1 from the bypass passage, the temperature sensitivity of the thermoelement 17 to the temperature of the coolant passing through the bypass passage is improved.

Further, as shown in FIG. 2(a), the plurality of ribs 3a1 is connected to a plurality of pillars 3g whose circumferential position coincides with the ribs 3a1, at the lower portion of the cylindrical portion 3a2. The spring seat 3b is raised against the lid 3d by the plurality of the pillars 3g. Between the spring seat 3b and the lid 3d, lateral holes 3h connecting the inside and the outside of the cylindrical portion 3a2 are formed between the adjacent pillars 3g, and the lateral holes 3h open between the adjacent ribs 3a1. This allows the coolant in the bypass passage to flow into the accommodation chamber 20a through the lateral holes 3h in addition to the first flow passage L1 when the lower end of the thermoelement 17 positions on the halfway of the cylindrical portion 3a2 (the portion with grooves). Thus, the lateral holes 3h form a second flow passage L2 communicating the bypass passage with the accommodation chamber 20a. This ensures a sufficient flow amount of coolant flowing through the bypass passage.

Further, since the coil spring 16 locates at the upper side of the lateral holes 3h (at the valve seat 20b side in the motion direction of the thermoelement 17), it is possible to prevent the occurrence of a large pressure loss due to the coil spring 16 blocking the flow of the coolant flowing through the flow passage L2 and a sufficient flow of the cooling liquid through the bypass passage can be ensured.

As for the auxiliary housing 3, since the element retainer 3a, the spring seat 3b, and the bypass-side pipe 6 are integrally formed by injection molding, for example, to a single member, the number of parts as a thermostat device can be reduced and the man-hours for assembly can be eliminated. Further, the rattling of the element retainer 3a and the spring seat 3b can be suppressed and the endurance of parts can be improved.

Next, the structure of assembling the main housing 2 and the auxiliary housing 3 will be described. As shown in FIGS. 2(a) and 2(b), the auxiliary housing 3 has an annular lid 3d, and at the periphery of which a plurality of claws 3d1 (four in the drawing) with an equal spacing is formed protruding outward radially.

Figure 3:
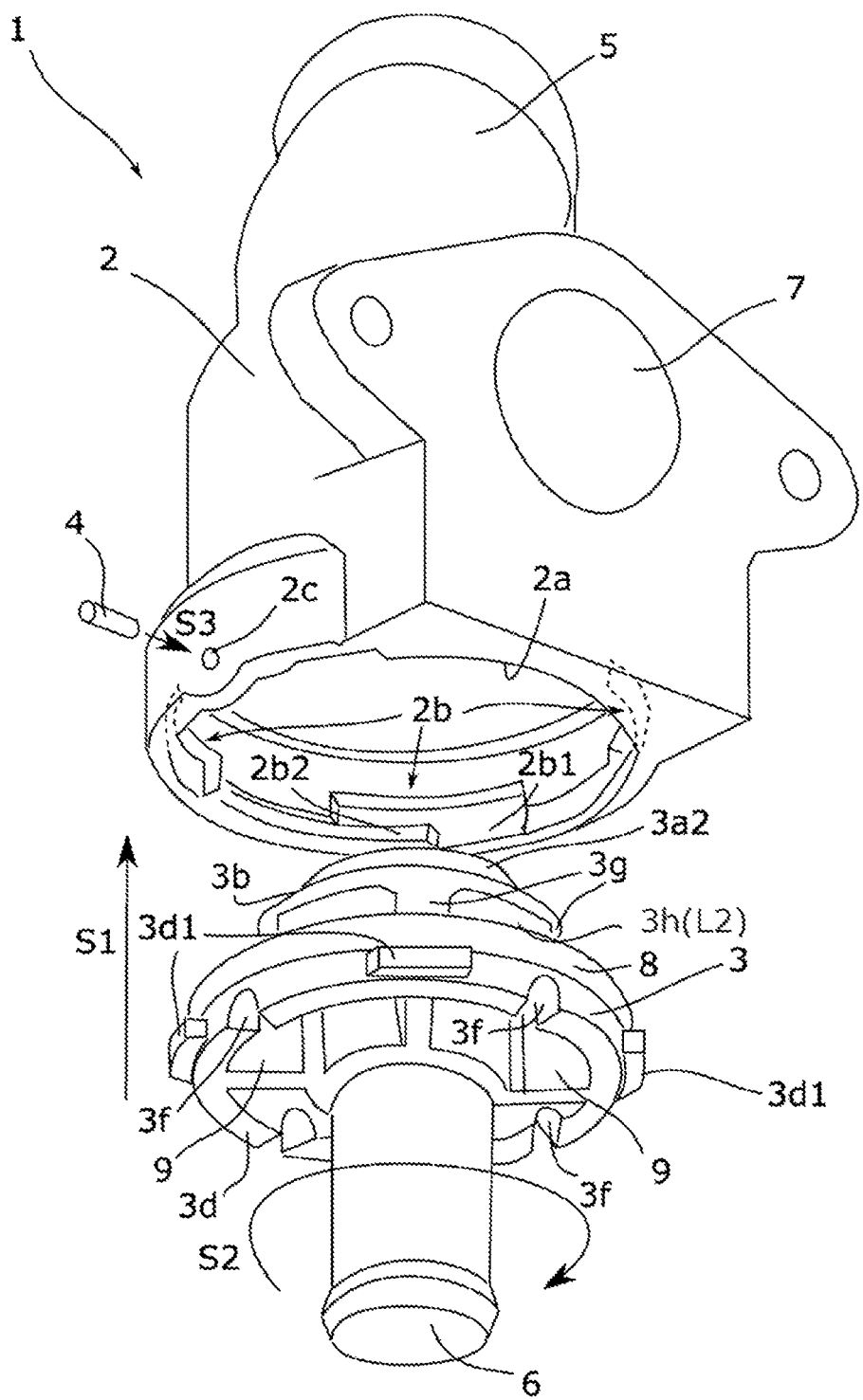
FIG. 3 is a perspective view of a main housing and the auxiliary housing before assembling viewed from below.

While, as shown in FIG. 3 as a perspective view viewed from below, a locking member 2b with which the claw 3d1 can be locked is formed correspondingly to the tab 3d1 on the inner circumferential lower edge of the main housing 2. The term "locking" means that members lock and stop with each other, and are stopped in a state where the claw portion 3d1 is caught against the locking member 2b. The locking member 2b has an inserting path 2b1 for the claw 3d1 and locking tab 2b2. Namely, the claws 3d1 are fitted in the inserting paths 2b1 by putting the auxiliary housing 3 into the lower opening 2a of the main housing 2. (Indicated by an arrow S1 in FIG. 3)

Then, by rotating (twisting) the auxiliary housing 3 relative to the main housing 2 in the positive direction slightly in the circumferential direction, the claws 3d1 are locked with the locking tab 2b2 (indicated by an arrow S2 in FIG. 3), and the main housing 2 and the auxiliary housing 3 are fitted (a fastening structure by the bayonet method).

A plurality of cutout recesses 3f is formed on the periphery of the lid 3d of the auxiliary housing 3, as shown in FIG. 2(b). In contrast, through-holes 2c are formed on the lower part of the main housing 2, as shown in FIG. 3. In a state where the auxiliary housing 3 is fitted to the main housing 2, when the position of any one of the cutout recesses 3f is aligned to the through-hole 2c, the rotation of the auxiliary housing 3 in the forward/backward direction is blocked by inserting a pin 4 thereinto as shown in FIG. 3 and the assembly is completed (indicated by an arrow S3 in FIG. 3).

As described above, the main housing 2 with the radiator-side pipe 5 and the auxiliary housing 3 with the bypass-side pipe 6 are fastened easily by the relative rotation in the circumferential direction without employing bolt fastening or welding, which can suppress the necessary cost and man-hours.

The axial center of the bypass-side pipe 6 is located on the rotational axis which is the rotation center when the main housing 2 and the auxiliary housing 3 are fastened by rotation. Therefore, the circumferential insertion position of the auxiliary housing 3 into the lower opening 2a of the main housing 2 is not a concern. Regardless of the insertion position in the circumferential direction, the position of the bypass-side pipe 6 to the radiator-side pipe 5 or the position of the bypass-side pipe 6 to the engine-side passage 7 remains unchanged. Further, any one of the positions of the plurality of the cutouts 3f is configured to necessarily coincide with the position of the through-hole 2c of the main housing 2, regardless of the insertion position in the circumferential direction of the auxiliary housing 3 to the lower opening 2a of the main housing 2.

An O-ring 8 as a seal member which closes the fastening portion of the main housing 2 and the auxiliary housing 3 in a liquid-proof manner is provided on the upper side of the plurality of claws 3d1 as shown in FIG. 1. Thus it is advantageous in durability because the claws 3d1 are provided outside of the O-ring and the claws 3d1 is not immersed in the coolant.

Further, since, as described above, the main housing 2 and the auxiliary housing 3 are joined by engaging with the claws 3d1 and a locking member 2b, and only a small amount of rotation (only slightly twisting) of the auxiliary housing 3 is required for fastening, the twisting of the O-ring 8 and the coil spring 16 can be minimized.

Figure 4:
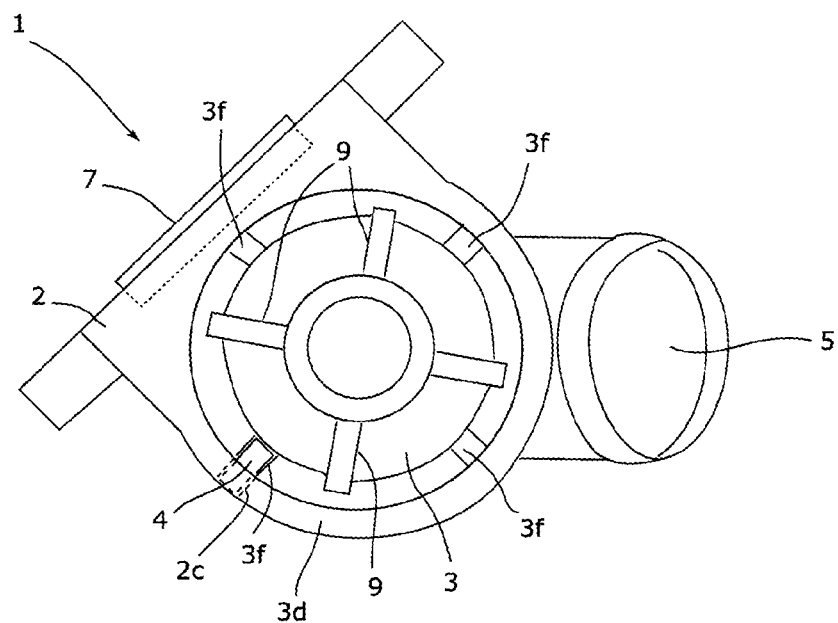
FIG. 4 is a bottom view of the housing.
Figure 5:
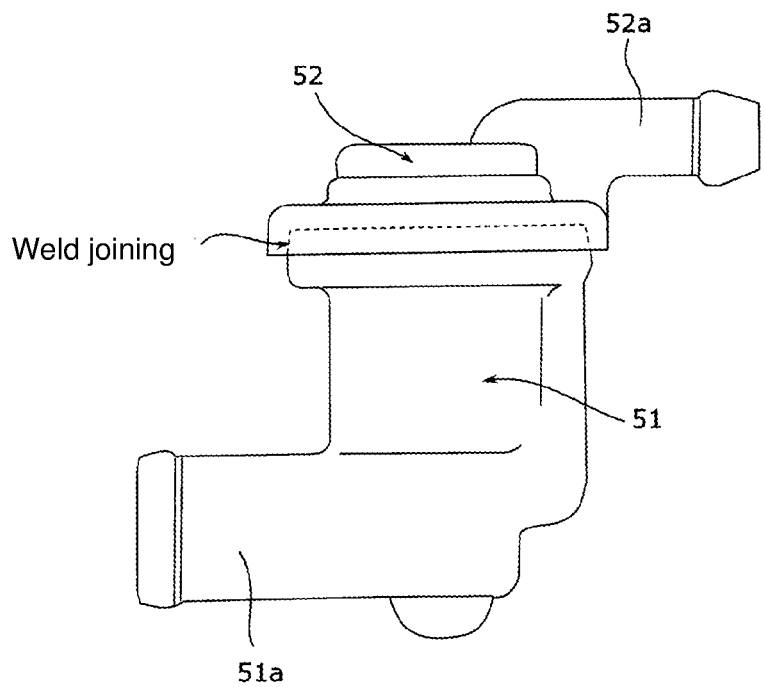
FIG. 5 is a side view of a conventional thermostat device.

A plurality of ribs 9 (4 pieces in the drawing) are formed at equal intervals radially outward from the circumferential surface of the bypass-side pipe 6 on the backside of the auxiliary housing 3 as shown in FIGS. 3 and 4 (FIG. 4 is a bottom view of housing 1.) When the auxiliary housing 3 is rotated and fastened to the main housing 2, the provision of rib 9 in this way allows the auxiliary housing 3 to be fastened by hooking a tool on the rib 9 to rotate without gripping the bypass-side pipe 6.

When the thermostat device is manufactured to which such housing 1 is employed, the main valve body 15, the coil spring 16, the piston 18, thermoelement 17, and others can be properly housed in the main body section 20 from the lower opening 2a of the main housing 2.

Followingly, the auxiliary housing 3 is inserted into the lower opening 2a of the main housing 2. In this situation, the lower part of the thermoelement 17 is held by the element retainer 3a and the claws 3d1 are moored in the inserting paths 2b1.

Next, the tool is hooked to the rib 9 formed on the backside of the auxiliary housing 3, and the auxiliary housing 3 is rotated forward slightly to the main housing 2 in the circumferential direction, whereby the claws 3d1 lock with the locking tabs 2b2 and the main housing 2 fits and fastens to the auxiliary housing 3.

Last, the pin 4 is inserted into the cutout 3f from the through-hole 2c formed on the lower side of the main housing 2 for rotation locking of the auxiliary housing 3, and the assembly is completed.

According to the embodiment of the present invention, the main housing 2 with the radiator-side pipe 5 and the auxiliary housing 3 with bypass-side pipe 6 are easily fastened by the engagement of the plurality of claws 3d1 with the locking member 2b (fastening structure using a bayonet method). Therefore, the incurred costs and man-hours are largely eliminated compared to the fastening with bolt fastening and welding.

The thermostat device according to the present invention is not limited to the embodiment shown in the drawings. The invention is widely applicable to thermostat devices that use a housing in which a first housing member with a radiator-side pipe and a second housing member with a bypass-side pipe are fastened. In the thermostat device of the present embodiment, for example, a first flow-through port is a first inlet to which the coolant from the radiator flows, a second flow-through port is an outlet for the coolant leading to the engine, and the third flow-through port is a second inlet to which the coolant from the bypass-passage. The thermostat, however, may be disposed at the engine outlet side, the first flow-through port may be a first outlet of the coolant leading to the radiator, the second flow-through port may be an inlet to which the coolant from the engine flows in, and the third flow-through port may be the second outlet for the coolant leading to the bypass side.

In the present embodiment, the main housing 2 with the radiator-side pipe 5 and the auxiliary housing 3 with the bypass-side pipe 6 are engaged and fastened by a bayonet method (by relative rotation in the circumferential direction). The present invention is not limited to the bayonet method, but the main housing 2 and the auxiliary housing 3 may be fastened by relative rotation (for example, fastened by screwing one housing with a male-threaded portion with another housing with a female-threaded portion). Further, the pin 4 locks the rotation of the auxiliary housing 3 against the main housing 2, but the rotation locking method is not limited to the pin 4 and may be changed properly.

REFERENCE SIGN LIST

1 housing for a thermostat (simply referred to as housing)
2 main housing (a first housing member)
2b locking member
3 auxiliary housing (a second housing member)
3a element retainer (holder for a temperature sensing unit)
3a1 rib
3a2 cylindrical portion
3b sprig seat
3d1 claws
5 radiator-side pipe
6 bypass-side pipe
7 engine-side passage (second flow-through port)
10 thermostat device
15 main valve body
16 coil spring
20 main body section
20a accommodation chamber
20b valve seat
21 first flow-through port
22 third flow-through port

What is claimed is:

1. A thermostat device disposed at a connecting portion between a cooling passage circulating a coolant passing through a radiator to an engine and a bypass passage connected to the cooling passage circulating the coolant bypassing the radiator to the engine, the thermostat device comprising:
   a main body section having a cylindrical shape inside of which an accommodation chamber is formed;
   a first flow-through port communicating a radiator side of the cooling passage with the accommodation chamber;
   a second flow-through port communicating an engine side of the cooling passage with the accommodation chamber;
   a housing having a third flow-through port communicating the bypass passage with the accommodation chamber;

a thermoelement, accommodated in the accommodation chamber, which is axially movable within the main body section according to the temperature of the coolant;

a valve body that opens and closes a communication section between the first flow-through port and the second flow-through port by coming near to or away from a valve seat provided inside of the housing caused by the movement of the thermoelement; and a biasing member that biases the valve body toward the valve seat, the housing comprising:

a first housing member having the main body section, the first flow-through port, and the second flow-through port; and a second housing member that is fastened with the first housing member by rotation against the first housing member in a circumferential direction and has the third flow-through port, wherein a fastening portion of the first and second housing members has a bayonet structure that a plurality of claws formed on one of the first and the second housing members engage a plurality of recesses formed on the other housing member.

2. The thermostat device recited in claim 1, wherein the second housing member is provided with a bypass-side pipe with the third flow-through port formed inside, and the bypass-side pipe is arranged such that a center of the bypass-side pipe is located on an axis of rotation at a time the first housing member and the second housing member are fastened by circumferential relative rotation.

3. A method for manufacturing the thermostat device recited in claim 2, comprising:

a first processing step of accommodating members to be accommodated in any one of the first housing member with the first flow-through port where the coolant flows and the second housing member with the second flow-through port where the coolant flows; and a second processing step of fastening the first housing member to the second housing member by a relative rotation in a circumferential direction.

4. The thermostat device recited in claim 1, wherein the second housing member is provided with a bypass-side pipe inside which the third flow-through port is formed, a thermoelement retainer having a cylindrical shape into which the thermoelement is inserted movably along an axial direction, and a spring seat that receives the biasing member, wherein the bypass-side pipe, the thermoelement retainer, and the spring seat are integrally formed.

5. The thermostat device recited in claim 4, wherein the thermoelement retainer has a cylindrical portion protruding into the accommodation chamber, the cylindrical portion has a groove along the axial direction on an inner circumference of the cylindrical portion and a lateral hole opening into the groove, and the groove forms a first flow passage that communicates the bypass passage with the accommodation chamber, and the lateral hole forms a second flow passage that communicates the bypass passage with the accommodation chamber.

6. The thermostat device recited in claim 5, wherein the biasing member is positioned closer to the valve seat in a moving direction of the thermoelement than the lateral hole.

7. A method for manufacturing the thermostat device recited in claim 6, comprising:

a first processing step of accommodating members to be accommodated in any one of the first housing member with the first flow-through port where the coolant flows and the second housing member with the second flow-through port where the coolant flows; and a second processing step of fastening the first housing member to the second housing member by a relative rotation in a circumferential direction.

8. A method for manufacturing the thermostat device recited in claim 5, comprising:

a first processing step of accommodating members to be accommodated in any one of the first housing member with the first flow-through port where the coolant flows and the second housing member with the second flow-through port where the coolant flows; and a second processing step of fastening the first housing member to the second housing member by a relative rotation in a circumferential direction.

9. A method for manufacturing the thermostat device recited in claim 4, comprising:

a first processing step of accommodating members to be accommodated in any one of the first housing member with the first flow-through port where the coolant flows and the second housing member with the second flow-through port where the coolant flows; and a second processing step of fastening the first housing member to the second housing member by a relative rotation in a circumferential direction.

10. A method for manufacturing the thermostat device recited in claim 1, comprising:

a first processing step of accommodating members to be accommodated in any one of the first housing member with the first flow-through port where the coolant flows and the second housing member with the second flow-through port where the coolant flows; and a second processing step of fastening the first housing member to the second housing member by a relative rotation in a circumferential direction.

* * * * *